(12) United States Patent
Jacobson

(10) Patent No.: US 9,657,928 B1
(45) Date of Patent: May 23, 2017

(54) WIRELESS REPLACEMENT LED BULB WITH ONE OR MORE ACCOMPANYING CONTROL SWITCHES

(71) Applicant: Crestron Electronics, Inc., Rockleigh, NJ (US)

(72) Inventor: Doug Jacobson, Oradell, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 55 days.

(21) Appl. No.: 14/969,232

(22) Filed: Dec. 15, 2015

Related U.S. Application Data

(63) Continuation of application No. 14/969,208, filed on Dec. 15, 2015.

(51) Int. Cl.
| | | |
|---|---|---|
| *F21V 23/04* | (2006.01) | |
| *H05B 37/02* | (2006.01) | |
| *H05B 33/08* | (2006.01) | |
| *F21K 9/232* | (2016.01) | |
| *F21V 29/76* | (2015.01) | |
| *F21Y 115/10* | (2016.01) | |

(52) U.S. Cl.
CPC .............. *F21V 23/04* (2013.01); *F21K 9/232* (2016.08); *F21V 23/0435* (2013.01); *F21V 23/0485* (2013.01); *F21V 29/763* (2015.01); *H05B 33/0845* (2013.01); *H05B 37/0272* (2013.01); *F21Y 2115/10* (2016.08)

(58) Field of Classification Search
CPC   H05B 37/02; H05B 37/0272; H05B 37/0227; H05B 33/08; H05B 33/0845; F21V 29/763; F21V 23/04; F21V 23/0485; F21K 9/232
See application file for complete search history.

(56) References Cited

U.S. PATENT DOCUMENTS

| | | | |
|---|---|---|---|
| 8,506,340 B1 | 8/2013 | Kumar et al. | |
| 9,081,269 B2 * | 7/2015 | Conti | F21V 23/0435 |
| 9,107,248 B2 * | 8/2015 | Chen | H05B 37/0218 |
| 2014/0056001 A1* | 2/2014 | Hsu | F21V 23/006 362/249.02 |
| 2014/0070703 A1* | 3/2014 | Chen | H05B 33/0803 315/113 |
| 2014/0265836 A1* | 9/2014 | Nourbakhsh | F21V 23/06 315/71 |
| 2016/0374177 A1* | 12/2016 | Chen | H05B 37/0218 |

* cited by examiner

*Primary Examiner* — Thai Pham
(74) *Attorney, Agent, or Firm* — Crestron Electronics, Inc

(57) ABSTRACT

A wireless replacement light bulb with one or more accompanying control switches, such as an integrated switch and/or a wireless lamp switch is provided. The bulb comprises a light source, such as an LED element, a controller, a wireless interface, and one or more accompanying control switches, such as an integrated switch and/or a wireless lamp switch. The bulb can be controlled, such as turned on or off, by a user using the integrated switch, the wireless lamp switch, or a combination thereof. The integrated switch and the wireless lamp switch does not remove power from the controller, allowing the controller to control the bulb in response to receiving a wireless control signal from a remote electronic device, such as a remote control, a smartphone, a tablet, or the like.

25 Claims, 9 Drawing Sheets

US 9,657,928 B1

WIRELESS REPLACEMENT LED BULB WITH ONE OR MORE ACCOMPANYING CONTROL SWITCHES

CROSS REFERENCE TO RELATED APPLICATIONS

This application is a continuation of a co-pending U.S. Non-provisional patent application Ser. No. 14/969,208, filed Dec. 15, 2015, the entire contents of which are expressly incorporated herein by reference.

BACKGROUND OF THE INVENTION

Technical Field

Aspects of the embodiments relate to wireless bulbs, and more specifically to a wireless replacement LED bulb with one or more accompanying control switches, such as an integrated switch and/or a wireless lamp switch.

Background Art

Light-emitting diode (LED) bulbs have become popular due to their lifespan and electrical efficiency, which considerably exceeds that of incandescent and fluorescent bulbs. While the upfront cost of LED bulbs is usually higher, they are cheaper to operate over the lifespan of the bulb, and their cost continues to drop. The LED bulbs on the market today are designed to be shaped similar to typical incandescent bulbs in order to fit in existing light fixtures and to appear familiar to consumers. However, LED bulbs can be easily adapted into any desired shape.

The semiconductor nature of the LED bulbs makes them inherently controllable. Today, LED bulbs are sold with built-in controllability enabling many "smart" applications. Replacement LED bulbs with wireless technology have become common in the marketplace. These bulbs generally comprise an LED light source, a remote control, and a Wi-Fi controller. The bulbs can be dimmed and turned on and off wirelessly using the remote control or via a smartphone or tablet through the Wi-Fi controller.

However, there is a fundamental flaw in currently available wirelessly controllable LED bulbs. If power to the LED bulb is removed, it cannot be turned on remotely using a wireless signal. This is particularly problematic with table lamps and floor lamps, where wireless control can be quite convenient, but users are also accustomed to turning the lamp on and off using a switch on the lamp itself. When the lamp switch is turned off by the user, the power is cut off to the LED bulb and the user can no longer control the LED bulb remotely. This situation leads to frustration and confusion.

Accordingly, a need has arisen for a wireless replacement LED bulb with one or more accompanying control switches, such as an integrated switch and/or a wireless lamp switch.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a wireless replacement LED bulb with one or more accompanying control switches.

It is also an aspect of the embodiments to provide systems, methods, and modes for a wireless replacement LED bulb with an integrated switch.

It is also an aspect of the embodiments to provide systems, methods, and modes for a wireless replacement LED bulb with an accompanying wireless lamp switch.

It is further an aspect of the embodiments to provide systems, methods, and modes for a mechanical means that deters the user from using the lamp switch during regular operation of the lamp.

It is further an aspect of the embodiments to provide systems, methods, and modes for a wireless replacement LED bulb with a light indicating function for indicating to the user that power has been removed to the LED bulb.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to some aspects of the embodiments, a system is provided for wirelessly controlling a bulb. The system comprises a bulb and a wireless lamp switch adapted to connect to a rotary lamp switch of a lamp on which the bulb is installed. The bulb comprises a light source, a first wireless interface adapted to receive wireless control signals, and a controller electrically connected to the light source and the first wireless interface. The wireless lamp switch comprises a first portion, a second portion, a sensor, and a second wireless interface. The first portion of the wireless lamp switch is adapted to connect to the rotary lamp switch of the lamp. The second portion of the wireless lamp switch is connected to the first portion and adapted to rotate with respect to first portion and the rotary lamp switch upon rotation. The sensor of the wireless lamp switch is adapted to sense a rotational position of the second portion with respect to the first portion. The second wireless interface of the wireless lamp switch is adapted to transmit a wireless control signal to the first wireless interface of the controller of the bulb upon the sensor sensing a change in the rotational position of the second portion with respect to the first portion. The controller of the bulb is adapted to control an operation of the light source in response to receiving the wireless control signal from the wireless lamp switch.

According to some aspects of the embodiments, the wireless lamp switch can further comprise a power source. The wireless lamp switch can comprise one or more of an on and off switch, a high-medium-low switch, and a dimming switch. The light source of the bulb can comprise at least one LED element.

According to some aspects of the embodiments, the second portion is rotatably connected to the first portion, the first portion is adapted to be rotated by a user to actuate the rotary lamp switch, and the second portion is adapted to be rotated by the user to control the operation of the light source via the second wireless interface. The first portion can comprise an actuator knob connected to a longitudinal actuator portion, which is adapted to connect to the rotary lamp switch. The second portion can comprise a longitudinal rotating shaft having a bore sized to rotationally receive the longitudinal actuator portion therein.

According to some aspects of the embodiments, the second portion of the wireless lamp switch comprises a first position and a second position. At the first position, the second portion is adapted to rotate with respect to the first portion and the rotary lamp switch. The sensor is adapted to sense the rotational position of the second portion with respect to the first portion when the second portion is rotated while being in the first position. At the second position, the second portion is adapted to engage the first portion to actuate the rotary lamp switch. The second portion is adapted to be rotated by a user while being at the first position to control the operation of the light source via the second wireless interface, and the second portion is adapted to be rotated by the user while being at the second position to actuate the rotary lamp switch. The second portion can comprise an actuator knob connected to an end of the first portion, wherein the first position comprises the actuator knob in an unpressed position with respect to the first portion, wherein the second position comprises the actuator knob in a pressed position with respect to the first portion. The second portion can further comprise a first portion of an indexing gear with indexing teeth, and the actuator knob can comprise a second portion of the indexing gear with indexing teeth. The second portion of the indexing gear engages the first portion of the indexing gear at the second position.

According to some aspects of the embodiments, the bulb can further comprise an integrated switch adapted to be actuated by a user. The controller can control an operation of the light source in response to actuation of the integrated switch. The integrated switch can comprise one or more of an on and off switch, a high-medium-low switch, a dimming switch, and any combination thereof. The integrated switch can comprise one of a rotary collar switch, a rotary switch, a push button switch, a toggle switch, a rocker switch, a pull chain switch, a slide switch, a tactile switch, a paddle switch, and a capacitive sensor switch. In another embodiment, the integrated switch can comprise a capacitive sensor switch that energizes an electrically conductive surface on the bulb and detects the user touching the electrically conductive surface. In another embodiment, the bulb can further comprise a bulb shell that covers the light source, the integrated switch can be operably connected to the bulb shell, and the bulb shell can be adapted to actuate the integrated switch by being pressed. In another embodiment, the bulb further comprises a bulb base and the integrated switch comprises a rotary collar surrounding the bulb base adapted to be rotated about the bulb base by the user to control the operation of the light source. In another embodiment, the light source comprises at least one LED element, the bulb comprises an LED driver circuit that includes the controller and a bulb base that supports the LED driver circuit, and the bulb base comprises the integrated switch.

According to some aspects of the embodiments, the controller of the bulb is further adapted to control an operation of the light source in response to receiving a wireless control signal from a remote electronic device. The remote electronic device can comprise one of a remote control, a wireless wall switch, a smartphone, a tablet, a portable computer, intermediary network device, a wireless gateway, a router, a dedicated touch screen, a central control processor, a wireless hub, and any combination thereof.

According to another aspect of the embodiments, a system of provided for wirelessly controlling a bulb. The system comprises a bulb and a wireless lamp switch adapted to connect to a rotary lamp switch of a lamp on which the bulb is installed. The bulb comprises a light source, a first wireless interface adapted to receive wireless control signals, and a controller electrically connected to the light source and the first wireless interface. The wireless lamp switch comprises a longitudinal portion, an actuator knob, a sensor, and a second wireless interface. The longitudinal portion is adapted to connect to the rotary lamp switch of the lamp. The actuator knob is connected to an end of the longitudinal portion and has an unpressed position and a pressed position respect to the longitudinal portion. At the unpressed position, the actuator knob is adapted to rotate with respect to the longitudinal portion and the rotary lamp switch. At the pressed position the actuator knob engages the longitudinal portion to actuate the rotary lamp switch. The sensor of the wireless lamp switch is adapted to sense a rotational position of the actuator knob with respect to the longitudinal portion when the actuator knob is rotated while being in the unpressed position. The second wireless interface of the wireless lamp switch is adapted to transmit a wireless control signal to the first wireless interface of the controller of the bulb upon the sensor sensing a change in the rotational position of the actuator knob with respect to the longitudinal portion. The controller of the bulb is adapted to control an operation of the light source in response to receiving the wireless control signal from the wireless lamp switch.

According to another aspect of the embodiments, a method is provided for wirelessly controlling a bulb by a wireless lamp switch adapted to connect to a rotary lamp switch of the lamp on which the bulb is installed. The bulb comprises a light source, a first wireless interface, and a controller electrically connected to the light source and the first wireless interface. The method comprises the step of sensing by a sensor of the wireless lamp switch a rotational position of a second portion of the wireless lamp switch with respect to a first portion of the wireless lamp switch. The first portion of the wireless lamp switch is connected to the rotary lamp switch of the lamp, and the second portion of the wireless lamp switch is adapted to rotate with respect to the first portion. The method also comprises the step of transmitting via a second wireless interface of the wireless lamp switch a wireless control signal to the first wireless interface of the controller of the bulb upon the sensor sensing a change in the rotational position of the second portion with respect to the first portion. The method further comprises the step of controlling by the controller of the bulb an operation of the light source in response to receiving the wireless control signal from the wireless lamp switch. The method can further comprise the step of pairing the wireless lamp switch with the bulb. The method can further comprise the step of rotating the first portion to actuate the rotary lamp switch of the bulb. The method can further comprise the steps of (i) pressing the second portion with respect to the first portion; and (ii) while at the pressed position, rotating the second portion to engage the first portion to actuate the rotary lamp switch.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
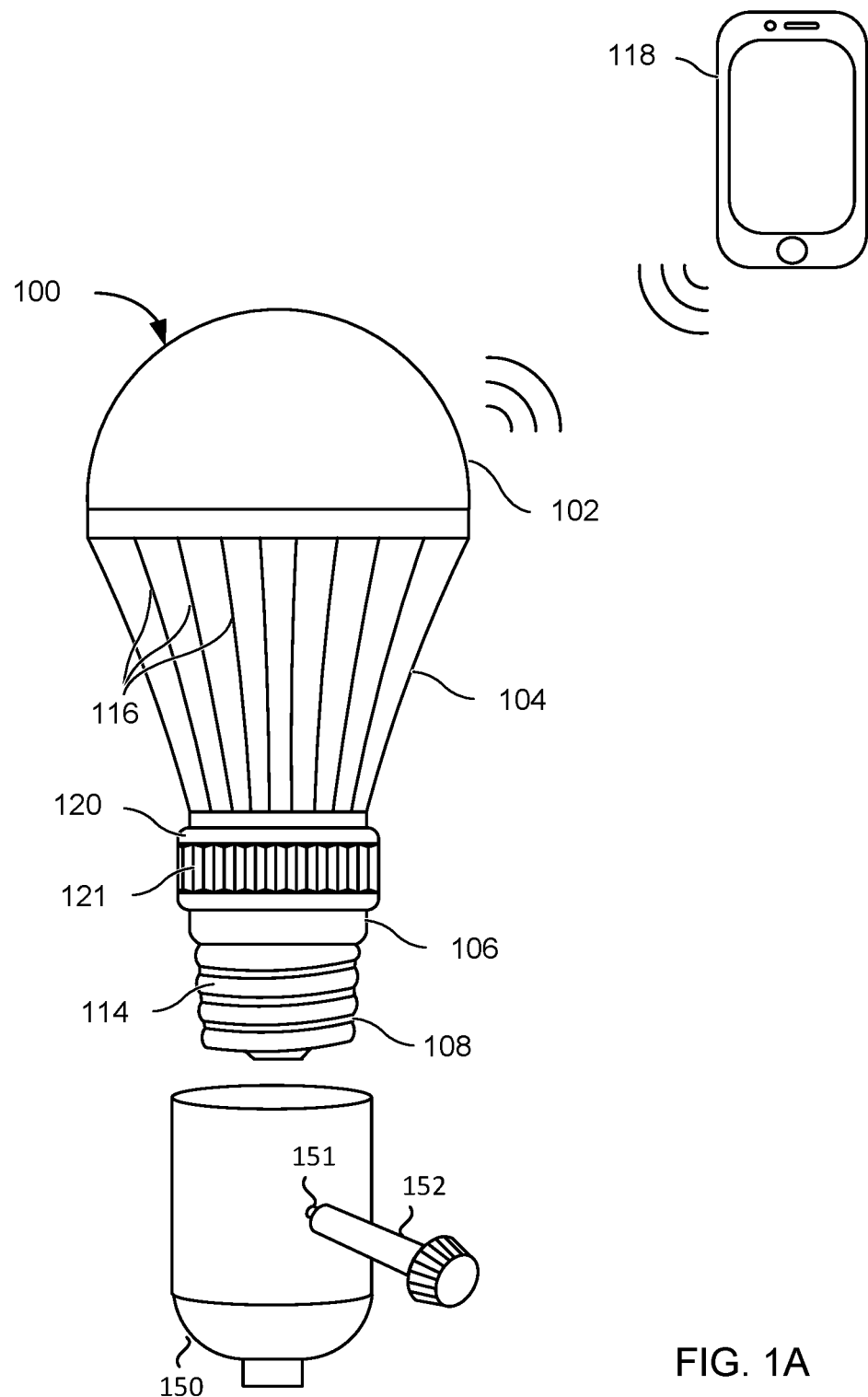
Figure 1B:
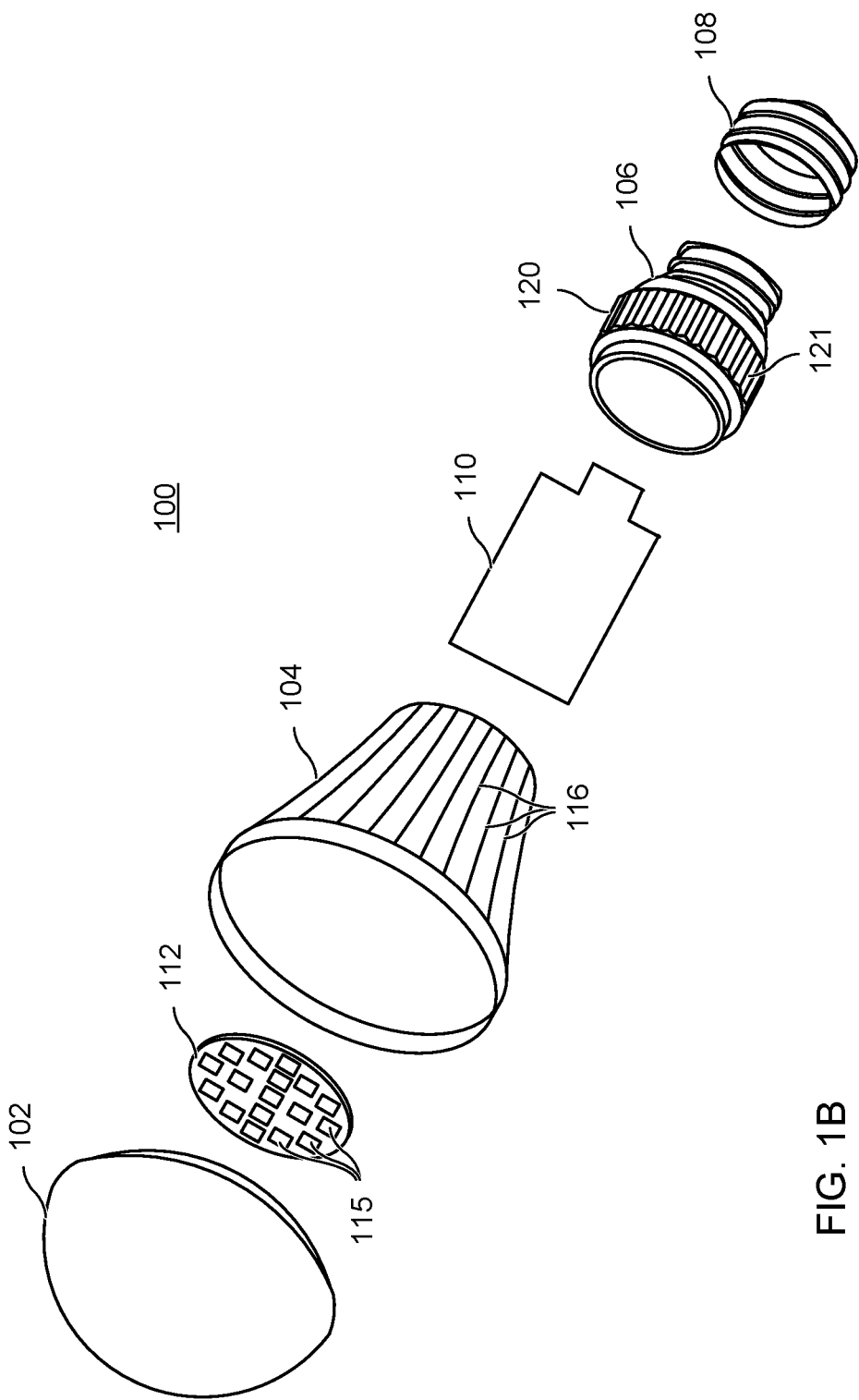
Figure 3:
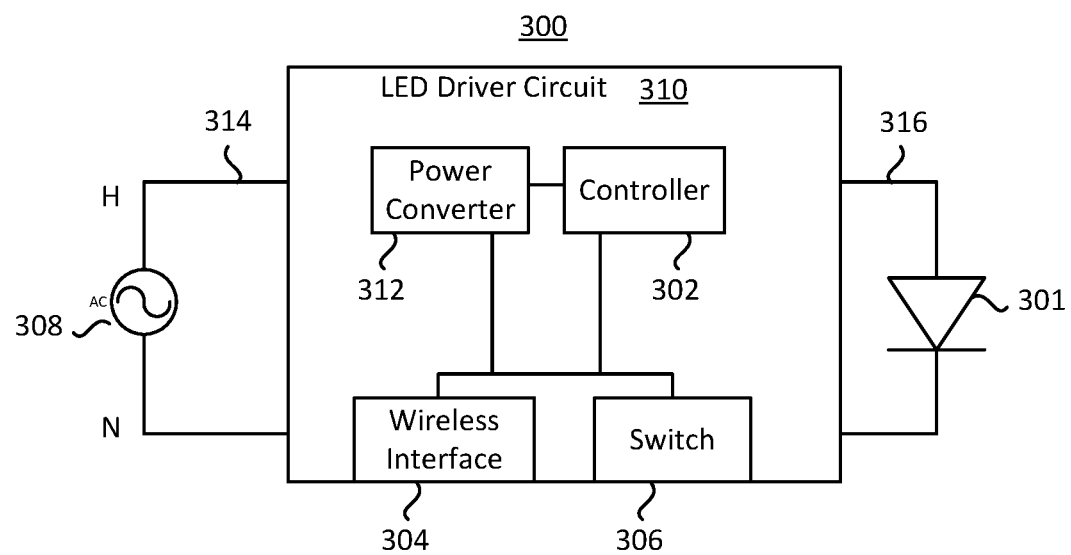
Figure 4:
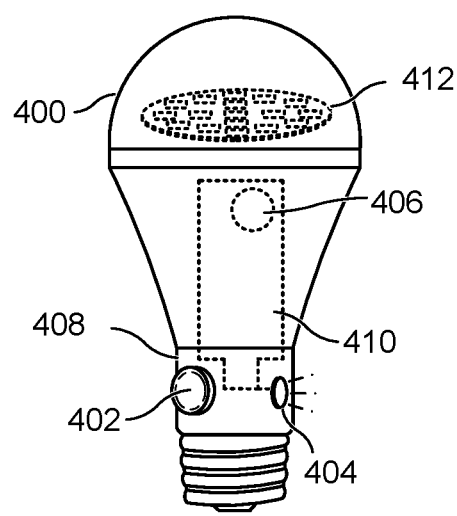
Figure 5:
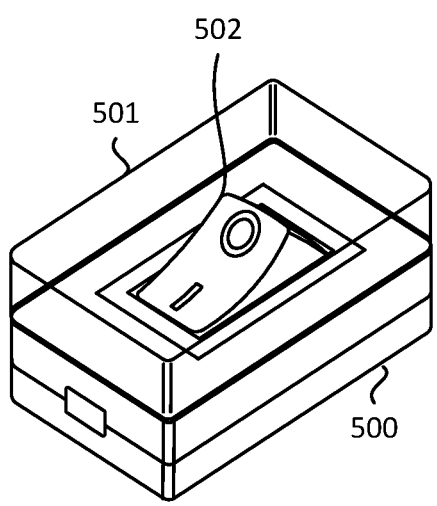
Figure 6A:
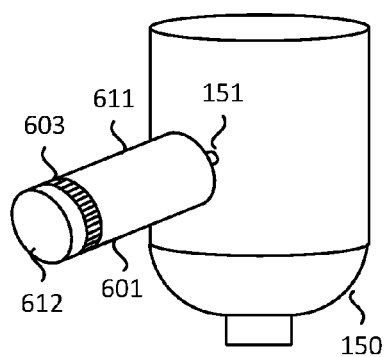
Figure 6B:
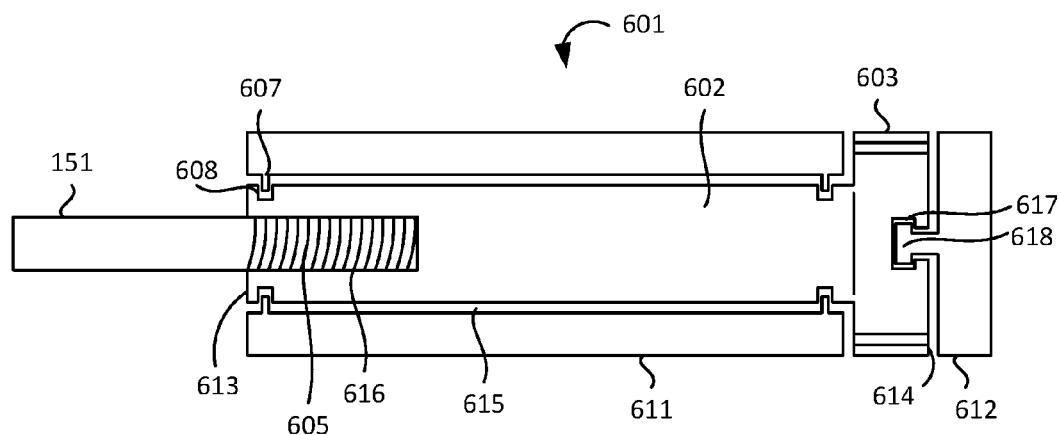
Figure 7A:
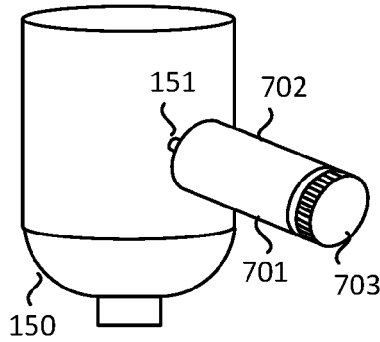
Figure 7D:
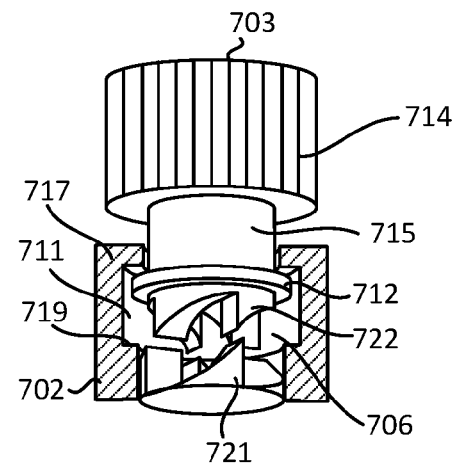
Figure 7B:
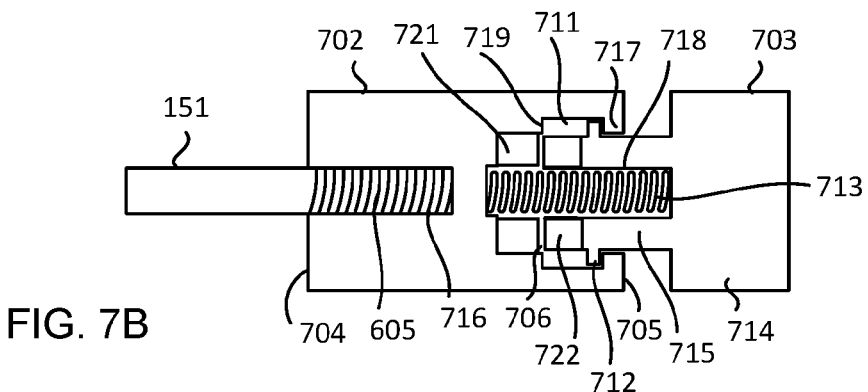
Figure 7C:
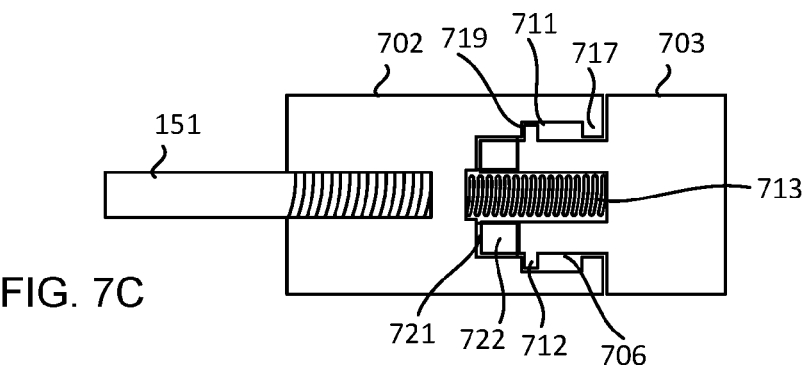
Figure 8A:
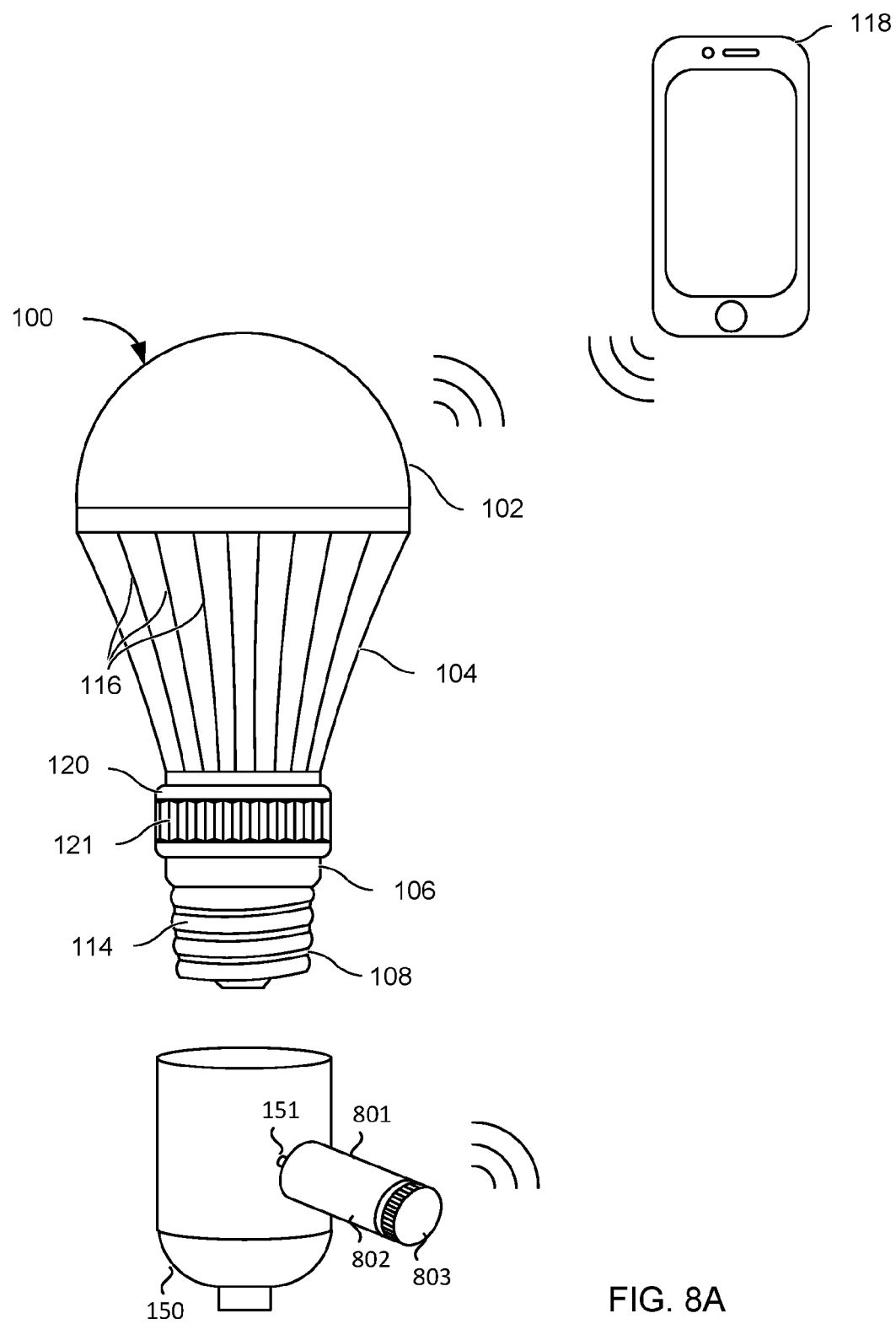
Figure 8B:
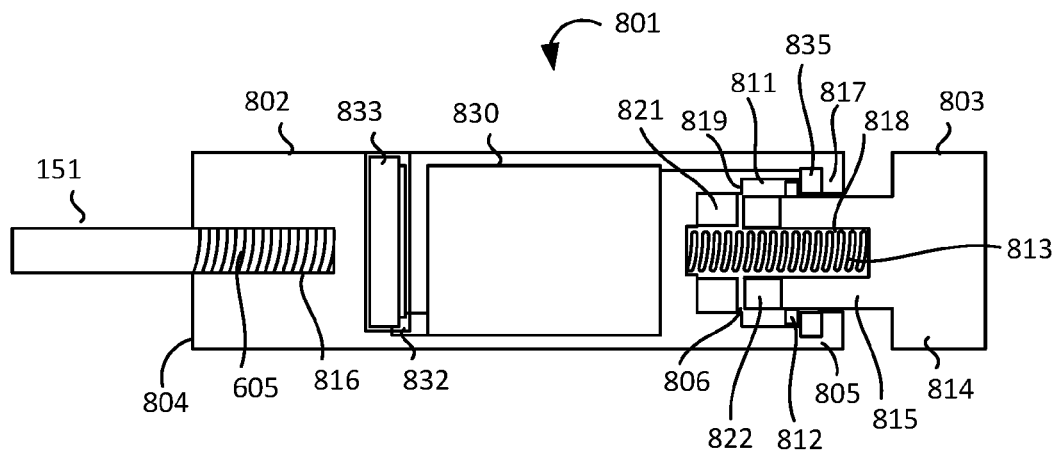
Figure 8C:
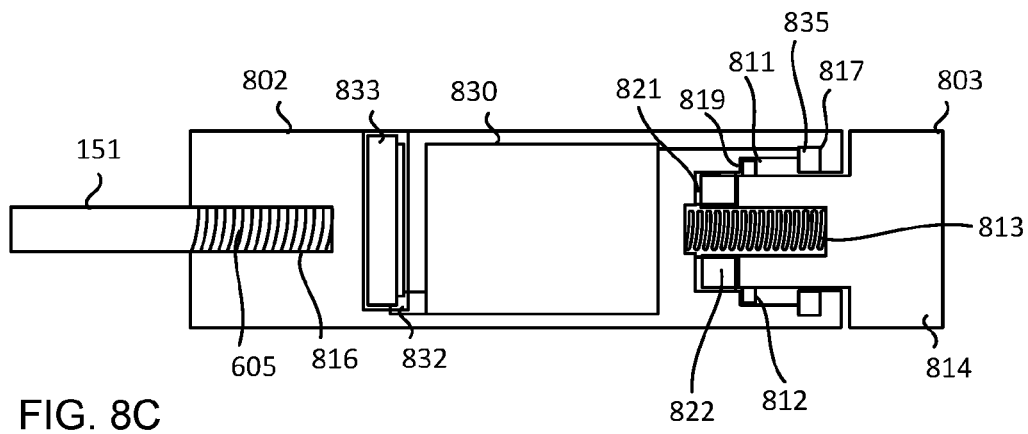
Figure 8D:
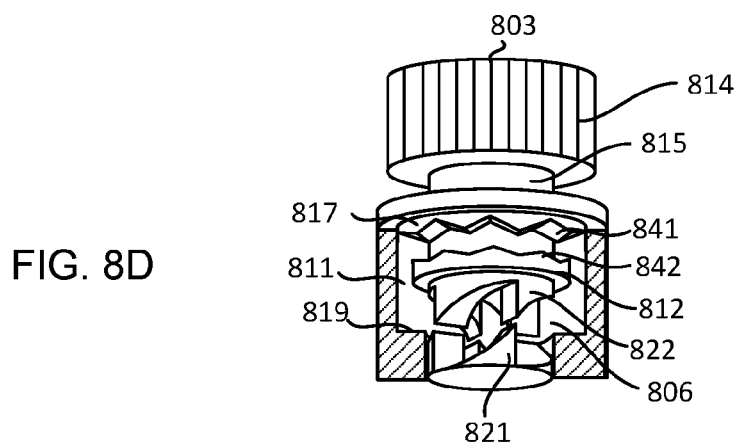

FIG. 1A illustrates a front view of a wireless replacement LED bulb with an integrated switch according to one embodiment;

FIG. 1B illustrates an exploded perspective view of the LED bulb with an integrated switch according to one embodiment;

FIGS. 2A-2D illustrate front view of wireless replacement LED bulbs with integrated switches according to various embodiments;

FIG. 3 illustrates a block diagram of a wireless replacement LED bulb with an integrated switch according to one embodiment;

FIG. 4 illustrates a front view of a wireless replacement LED bulb with a light indicator according to one embodiment;

FIG. 5 illustrates a replacement inline switch with a cover according to one embodiment;

FIG. 6A illustrates a perspective view of a replacement actuator for a lamp socket switch according to one embodiment;

FIG. 6B illustrates a cross sectional view of the replacement actuator of FIG. 6A;

FIG. 7A illustrates a perspective view of a replacement actuator for a lamp socket switch according to another embodiment;

FIG. 7B illustrates a cross sectional view of the replacement actuator of FIG. 7A in a first position;

FIG. 7C illustrates a cross sectional view of the replacement actuator of FIG. 7A in a second position FIG. 7D illustrates a partially cross sectional view of a portion of the replacement actuator of FIG. 7A;

FIG. 8A illustrates a perspective view of an LED bulb with an accompanying wireless lamp switch according to another embodiment;

FIG. 8B illustrates a cross sectional view of the wireless lamp switch of FIG. 8A in a first position;

FIG. 8C illustrates a cross sectional view of the wireless lamp switch of FIG. 8A in a second position; and FIG. 8D illustrates a partially cross sectional view of a portion of the wireless lamp switch of FIG. 8A.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as lighting devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 LED Bulb
102 Bulb Shell
104 Heat Sink
106 Bulb Base
108 Screw-in Base
110 LED Driver Circuit
112 LED Module
114 Threads
115 LED Elements
116 Fins
118 Smartphone
120 Rotary Collar Integrated Switch
121 Grooves
150 Lamp Socket
151 Rotary Socket Switch
152 Rotary Knob
200a-d LED Bulbs
201 Rotary Switch
202 Push Button/Capacitive Switch
203 Bulb Shell Switch
204 Capacitive Sensor Switch
206 Bulb Base
300 LED Bulb
301 LED Element
302 Controller
304 Wireless Interface
306 Switch
308 AC Power Supply
310 LED Driver Circuit
312 Power Converter
314 Input
316 Output
400 LED Bulb
402 Integrated Switch
404 Light Indicator
406 Battery
408 Bulb Base
410 LED Driver Circuit
412 LED Module
500 Inline Switch
501 Cover
502 Lamp Switch
601 Replacement Rotary Actuator
602 Longitudinal Actuator Portion
603 Actuator Knob
605 Threaded End 607 Projections
608 Channels
611 Longitudinal Rotating Shaft
612 Rotating Cap
613 First End
614 Second End
615 Bore
616 Threaded Bore
617 Recess
701 Replacement Actuator
702 Longitudinal Portion
703 Actuator Knob
704 First End
705 Second End
706 Bore
711 Circumferential Channel
712 Circumferential Projection
713 Biasing Spring
714 Knob Portion
715 Shaft Portion
716 Threaded Bore
717 Flange
718 Bore
719 Inner Lip
721 First Portion of an Indexing Gear with Indexing Teeth
722 Second Portion of an Indexing Gear with Indexing Teeth
801 Wireless Lamp Switch
802 Longitudinal Portion
803 Actuator Knob
804 First End
805 Second End
806 Bore
811 Circumferential Channel
812 Circumferential Projection
813 Biasing Spring
814 Knob Portion
815 Shaft Portion
816 Threaded Bore
817 Flange
818 Bore
819 Inner Lip
821 First Portion of an Indexing Gear with Indexing Teeth
822 Second Portion of an Indexing Gear with Indexing Teeth
830 Control Circuit
832 Recess
833 Battery
835 Sensor/Potentiometer
841 Detents
842 Detents

LIST OF ACRONYMS USED IN THE SPECIFICATION IN ALPHABETICAL ORDER

The following is a list of the acronyms used in the specification in alphabetical order.
AC Alternating Current
ASIC Application Specific Integrated Circuit
DC Direct Current
Hz Hertz
IR Infrared
LED Light-Emitting Diode
RAM Random-Access Memory
RF Radio Frequency
ROM Read-Only Memory
V Volt

MODE(S) FOR CARRYING OUT THE INVENTION

For 40 years Crestron Electronics Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as 100, 200*a-d*, 300, 400, 500, 601, 701, and 801 can be manufactured by Crestron Electronics, Inc., located in Rockleigh, N.J.

The different aspects of the embodiments described herein pertain to the context of a wireless replacement LED bulb with one or more accompanying control switches, such as an integrated switch and/or a wireless lamp switch, but is not limited thereto, except as may be set forth expressly in the appended claims. While a bulb with an LED light source technology is described herein, the embodiments described herein may be used in wireless bulbs with other types of light source technologies currently known or later developed.

According to one aspect of the embodiments, disclosed herein are systems, methods, and modes for a wireless replacement LED bulb with a switch integrated into the base of the bulb. Referring to FIGS. 1A and 1B, FIG. 1A illustrates a front view of a wireless replacement LED bulb 100 with an integrated switch and FIG. 1B illustrates an exploded perspective view of the LED bulb 100. LED bulb 100 comprises a bulb shell 102, a heat sink 104, a bulb base 106, and a screw-in base 108. In addition, an LED module 112 and an LED driver circuit 110 are disposed within the LED bulb 100.

LED module 112 comprises one or more LED elements or light sources 115 disposed on a printed circuit board. LED elements 115 are powered by the LED driver circuit 110 to emit light. The bulb shell 102 is used to protect the LED module 112 and also to diffuse the light emitted from the LED module 112. In various embodiments, the bulb shell 102 can comprise various shapes known in the art, including partially spherical, bulged, tubular, reflector, candle, or other bulb shapes known to those skilled in the art. The bulb shell 102 can be clear or opaque, and can comprises plastic, glass, fiber glass, or other materials known to those skilled in the art.

The LED driver circuit 110 controls the operation of the LED module 112, as described in greater detail below. It converts an alternating current (AC) to a direct current (DC) and regulates the power supplied to the LED module 112 to control the LED module 112. It can control the operation of the LED module 112 in a variety of ways, including, but not limited to, turning the LED module 112 on and off, dimming, incremental dimming, such as a high-medium-low operation, light sensing, and adjusting the color of the bulb's light output.

Additionally, the LED driver circuit 110 comprises a wireless interface (304 in FIG. 3) for receiving wireless control signals that direct the desired operation of the LED bulb 100. The control signals can originate from and be transmitted via a variety of means. In one embodiment, control signals can originate and be directly transmitted from a portable remote control or a wireless wall switch to the LED driver circuit 110 via short range communication. In other embodiments, the control signals can originate from a remote electronic device, such as a smartphone 118, a tablet, or a portable computer, or other portable electronic devices, and be transmitted to the LED driver circuit 110 directly or through intermediary network devices, such as a wireless gateway, a router, or other similar networking devices. In another embodiment, one or more LED bulbs 100 can be integrated with a home automation system and can receive control signals from a central control processor, a wireless hub, or a similar device. The home automation system in turn can receive operating instructions from a user via a variety of means, including wired or wireless wall switches, dedicated touch screens, portable electronic devices, as described above, or other means known in the art. In yet another embodiment, control signals are transmitted to the LED driver circuit 110 from an accompanying wireless lamp switch as will be later described in more detail. In various embodiments, LED driver circuit 110 receives wireless control signals via radio frequency (RF), infrared (IR), or other communication technologies known to those skilled in the art.

The heat sink 104 encloses the LED driver circuit 110 to dissipate heat away from and cool the LED driver circuit 110. This improves the efficiency and prolongs the life of the internal electronics of the LED bulb 100. Heat sink 104 can comprise a plurality of fins 116 to maximize its surface area and effectively dissipate heat. In various embodiments, the heat sink 104 comprises aluminum, aluminum alloy, copper, magnesium, manganese, silicon, tin, zinc, composite materials, any combinations thereof, or other materials known to those skilled in the art.

The LED driver circuit 110 is mounted on bulb base 106, which connects the LED driver circuit to an electrical contact base, such as a screw-in base 108. Screw-in base 108 can be sized to fit a standard lamp socket 150. Base 108 can comprise a medium E-26 base with threads 114 that fit a medium base socket 150. However, base 108 can comprise other sizes and types to fit various sockets and fixtures, including, but not limited to a mogul E-39 base, an intermediate E-17 base, a candelabra E-12 base, a bayonet base, or a pin base, among others. Screw-in base 108 comprises electrically conductive material and is screwed into socket 150 to connect bulb 100 to an AC power supply.

The LED bulb 100 further comprises an integrated switch 120 that can be mounted on the bulb base 106. According to one embodiment, switch 120 comprises a rotary collar surrounding the base 106 of the LED bulb 100. The switch 120 may be rotated about the base 106 to control the operation of the LED bulb 100. For example, it can be rotated to turn the LED bulb 100 on or off. In another embodiment, rotary switch 120 can comprise an incremental control function with a high-medium-low light setting. In a further embodiment, rotary switch 120 may be a continuous dimming switch. Switch 120 can comprise grooves 121 disposed on its surface to assist a user to grip the switch 120.

Rather than using the lamp's power switch, such as rotary socket switch 151, a user would use the integrated switch 120 on the bulb 100. The integrated switch 120 is connected to the LED driver circuit 110, as described in greater detail below, directing the LED driver circuit 110 to control the light of the LED module 112, such as turning it on or off. As such, the AC power supplied to the LED bulb 100, and specifically to the LED driver circuit 110, does not get removed even when the integrated switch 120 is in an off position. Accordingly, even though the LED module 112 may be turned off using the switch 120, the LED bulb 100 may still be controlled remotely using a remote electronic device, such as a remote control or a smartphone 118, or any other means as described above. Upon receiving a wireless control signal from a smartphone 118, the LED driver circuit 110 can forgo the integral switch 120 and control the LED module 112, such as by turning it on.

Figure 2A:
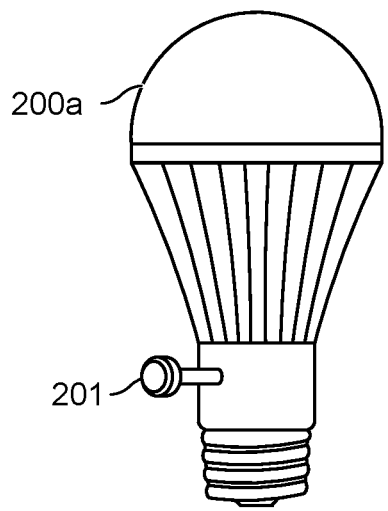
Figure 2B:
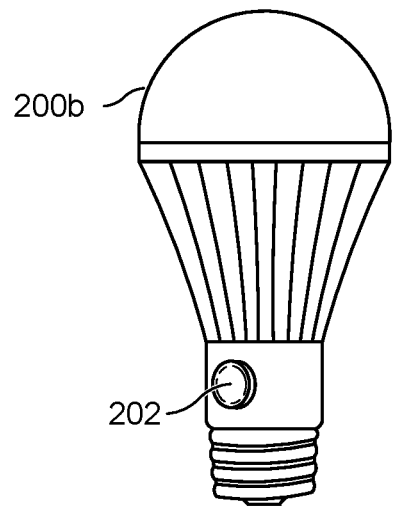
Figure 2C:
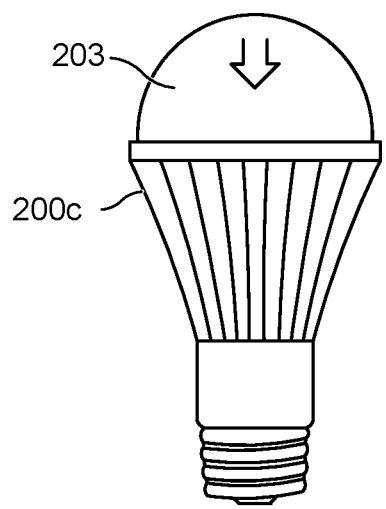

The local LED bulb switch can take various forms and designs. Some examples are shown in FIGS. 2A-2D. Referring to FIG. 2A, the LED bulb 200a can comprise a rotary lamp switch 201. In another embodiment, shown in FIG. 2B, the LED bulb 200b can comprise a push button switch 202. Alternatively, switch 202 can comprise a capacitive switch. In yet another embodiment, shown in FIG. 2C, the bulb shell 203 of the LED bulb 200c can be used to actuate an internal switch connected to the LED driver circuit 110. As such, the user may press the blub shell 203 to turn the LED bulb 200c on or off. In various other embodiments, the integrated switch can comprise a toggle switch, a rocker switch, a pull chain switch, a slide switch, a tactile switch, a paddle switch, or other types of switches known to those skilled in the art.

Figure 2D:
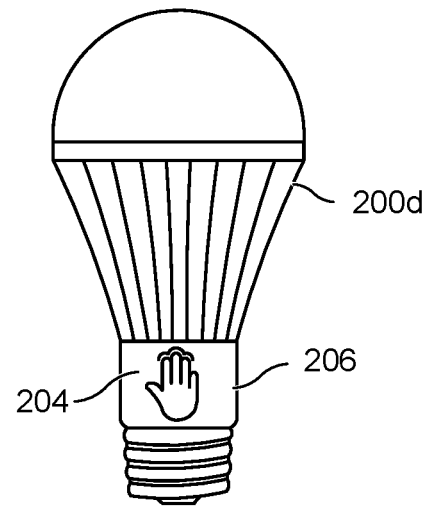

In yet another embodiment, shown in FIG. 2D, the LED bulb 200d can comprise a capacitive sensor switch 204. In one embodiment, the LED driver circuit 110 comprises an RC oscillator that energizes an electrically conductive surface 204 of a dedicated touch area on the LED bulb 200d. The electrically conductive surface 204 can be located in various locations about the LED bulb 200d. In one embodiment, the electrically conductive surface 204 is located about at least a portion of the bulb base 206. The RC oscillator turns the conductive surface 204 of the LED bulb 200d into a capacitor. When a person touches the electrically conductive surface 204 of the LED bulb 200d, the capacitance of the electrically conductive surface 204 changes, also changing the frequency of the oscillator. When a large enough difference in frequency is detected by the LED driver circuit 110, the LED driver circuit 110 registers it as a touch and directs the LED module 112 to turn on or off. The capacitive sensor switch 204 has the advantage of being spread about a substantial surface of the LED bulb 200d such that a user can easily access the LED bulb 200d and does not need to reach into an awkward space, or move the lamp to make the switch accessible.

FIG. 3 is a block diagram of the wireless replacement LED bulb 300 with an integrated switch 306, according to one illustrative embodiment. The LED bulb 300 comprises an LED driver circuit 310 and an LED element 301. According to one embodiment, the LED driver circuit 310 comprises a power converter 312, a controller 302, a wireless interface 304, and an integrated switch 306. It is contemplated that the LED driver circuit 310 may contain other circuitry, such as display elements, network drivers, a bridge rectifier, a dimming circuit, a driver circuit, sensors, and other logic known to those skilled in the art.

The input side 314 of the LED driver circuit 310 is connected to an AC power supply 308 through an electric socket, such as socket 150. For example, the AC power supply 308 may be a 120 Volt (V) 60 Hertz (Hz) AC mains residential power supply. A hot input terminal of the screw-in base 108 connects to an AC source hot conductor and a neutral input terminal of the screw-in base 108 connects to an AC source neutral conductor. The output side 316 of the LED driver circuit 310 is connected to the LED element 301. The LED element 301 is illuminated via the electric power output from the LED driver circuit 310. Although a single LED element 301 is illustrated, the LED driver circuit 310 can be connected to an LED module, such as LED module 112 discussed above, comprising a plurality of LED elements disposed on a printed circuit board.

The controller 302 controls the operation of the LED element 301. Controller 302 can represent one or more microprocessors, and the microprocessors can be "general purpose" microprocessors, a combination of general and special purpose microprocessors, or application specific integrated circuits (ASICs). Controller 302 can provide processing capability to provide processing for one or more of the techniques and functions described herein. In an embodiment, the LED driver circuit 310 further comprises a memory for storing configuration information for the LED driver circuit 310 for use by the controller 302. The memory can be communicably coupled to controller 302 and can store data and executable code. The memory can represent volatile memory such as random-access memory (RAM), but can also include nonvolatile memory, such as read-only memory (ROM) or Flash memory.

The power converter 312 is configured for generating and regulating a DC voltage for powering the controller 302, the wireless communication interface 304, the LED element 301, and other low-voltage circuitry of the LED driver circuit 310.

The controller 302 receives wireless control signals via the wireless communication interface 304. For example, the wireless communication interface 304 can be an RF receiver configured for receiving control signals via a wireless RF signal. In a further embodiment, the wireless communication interface 304 is configured for communicating bidirectionally. In this embodiment, the wireless communication interface 304 may comprise an RF transceiver. In various embodiments, the wireless interface 304 communicates with a remote electronic device, such as a remote control or the smartphone 118, a wireless lamp switch, or other means discussed above, using Bluetooth®, Wi-Fi, ZigBee®, Z-Wave, infiNET EX® from Crestron Electronics, Inc. of Rockleigh, or other communication technologies known to those skilled in the art. In another embodiment, the wireless communication interface 304 comprises an infrared (IR) receiver or transceiver.

The controller 302 further receives control signals from a switch 306, such as integrated switches 120, or 201-204 discussed above. Switch 306 is integrated with the LED bulb 300 and can be integral with the LED driver circuit 310, or it can be electrically connected to the LED driver circuit 310 but placed at a distance from the LED driver circuit 310, such as in proximity to the blub shell 203 shown in FIG. 2C. Switch 306 can be actuated by the user to locally control the LED element 301, such as by turning it on or off, dimming it, controlling it via a high-medium-low setting, or other operations known in the art. Rather than using a lamp's power switch, such as lamp socket switch 151, a user would use the switch 306 on the bulb 300 to control the lamp. This switch 306 provides an input signal to the controller 302, which in turn decides how to control the LED element 301. For example, switch 306 may comprise a dimming switch that communicates to the controller 302 to dim the LED element 301.

Notably, AC power 308 is not removed from the LED driver circuit 310, and particularly from the controller 302, during the operation of the integrated switch 306. Accordingly, at all times, a user can control the LED driver circuit 310 either locally with switch 306, or wirelessly through the wireless interface 304 using a remote electronic device, such as a remote control or a smartphone 118, or via other means discussed above. For example, after turning the LED element 301 off using the switch 306, the LED element 301 may still be turned on remotely using a smartphone 118. Upon receiving a wireless signal from the smartphone 118, the LED driver circuit 310 can forgo switch 306 and turn on the LED element 310.

According to another aspect of the present embodiments, the LED bulb may contain a warning indicating function upon detecting that power has been removed from the LED bulb. FIG. 4 illustrates a front view of a wireless replacement LED bulb 400 with a light indicator according to one embodiment. The LED bulb 400 may include a battery 406 provided for powering the controller therein, such as controller 302 discussed above. When the user accidentally removes power to the lamp, for example via socket 150 by turning a native lamp switch 151, the controller of the LED driver circuit 410 can detect lack of AC power supply. Upon detecting lack of power supply, the controller can use the power provided by battery 406 to transmit a warning control signal configured for indicating to the user that AC power has been removed and as a reminder to instead use the switch 402 integrated into the LED bulb 400. The indication can be visual or audible. This could be useful in a case where the user, accustomed to switching the lamp off in the usual manner, does so and as such removes the ability to control the lamp remotely. In one embodiment, the controller of the LED driver circuit 410 can transmit the warning control signal to the LED module 412 of the LED bulb 400. For example, the warning control signal can direct the LED module 412 of the LED bulb 400 to blink a few times, illuminate in a red color, or the like.

In another embodiment, upon detecting lack of power supply, the controller of the LED driver circuit 410 can use the power provided by battery 406 to transmit a warning control signal to a remote electronic device, such as a smartphone 118, which in turns indicates to the user that AC power has been removed from the LED bulb 400. For example, the remote electronic device can display a graphical or alphanumeric message to the user, or it can sound an audible noise through a speaker.

In yet another embodiment, the LED bulb 400 can comprise a separate indicator 404 in electrical communication with the battery 406. The indicator 404 can be disposed on the bulb base 408 and can provide a light indication, an audible indication, or some other type of indication to the user. For example, a light indicator 404 can comprise an LED element. In another embodiment, an audible indicator 404 can comprise a speaker, a buzzer, or the like. When the user accidentally removes power to the lamp socket 150 via a lamp switch 151, the controller of the LED driver circuit 410 can detect lack of the AC power supply and using power provided by battery 406 transmit a warning control signal to the indicator 404 directing the indicator 404 to visually or audibly indicate to the user that the power supply has been removed from the bulb. For example, the light indicator 404 can be directed to blink a few times, illuminate in a red color, or the like.

According to another aspect of the present embodiments, the switch on the lamp itself, which may be located on the lamp socket, lamp base, or lamp wire, or portion of a switch, such as the switch actuator, may be removed to avoid confusion with the switch integrated into the LED bulb of the present embodiments. In another embodiment, the switch on the lamp may be made less conspicuous. A replacement switch or portion of a switch, such as the switch actuator, can be provided to accompany the LED bulb 100 that still allows the user to disconnect the AC power from the socket 150 (e.g., when the user wishes to replace the bulb), but which comprises a mechanical means that deters the user from using the lamp switch 151 during regular operation. For example, as shown in FIG. 5, a replacement inline switch 500 can be provided with a cover 501 that first needs to be removed to actuate the lamp switch 502.

According to another embodiment, FIG. 6A illustrates a perspective view of a replacement actuator 601 for a lamp socket switch 151 and FIG. 6B illustrates a cross sectional view of the replacement actuator 601. Table or floor lamps on the market today typically contain a socket 150 with a rotary switch 151, and a conventional rotary knob 152 (FIG. 1A) threadably connected to the socket switch 151. The conventional rotary knob 152 can be removed by being unscrewed and replaced with the rotary actuator 601 of the present embodiment. Rotary actuator 601 comprises a longitudinal actuator portion 602, and one or more rotating portions, such as a longitudinal rotating shaft 611 and a rotating cap 612. Longitudinal actuator portion 602, rotating shaft 611 and rotating cap 612 can be tubular in shape. Longitudinal actuator portion 602 extends from a first end 613 to a second end 614. The first end 613 comprises a threaded bore 616 partially extending therethrough, which threads onto the threaded end 605 of the socket switch 151. The second end 614 of the actuator portion 602 comprises an actuator knob 603.

Longitudinal rotating shaft 611 comprises a bore 615 longitudinally extending therethrough and sized to rotationally receive the longitudinal actuator portion 602. Longitudinal actuator portion 602 comprises one or more channels 608 extending circumferential about its outer surface. Channels 608 are configured for receiving projections 607, which extend circumferentially from the inner surface of the bore 615 in the longitudinal shaft 611. The actuator knob 603 may be provided with a recess 617 on the second end 614 of the actuator portion 602 for receiving a projection 618 extending out of rotating cap 612. Longitudinal shaft 611 may freely rotate with respect to the actuator portion 602 via projections 607 and channels 608 such that when shaft 611 is rotated by a user it does not actuate the switch 151. Similarly, rotating cap 612 freely rotates with respect to the actuator portion 602. Actuator knob 603 can be rotated by the user to rotate the actuator portion 602 embedded within the longitudinal shaft 611, which in turn rotates and actuates the socket switch 151.

According to an embodiment, the actuator knob 603, the rotating shaft 611, and the rotating cap 612 comprise substantially the same diameter. The actuator knob 603 is disposed between the rotating shaft 611 and the rotating cap 612. Accordingly, it is not convenient for the user to use the replacement actuator 601 for actuating the lamp socket switch 151, yet it is still possible if power needs to be removed for safety reasons (e.g. replacing the bulb). Rotating shaft 611 and rotating cap 612 provide mechanical means that prevent intuitive actuation of the socket switch 151, thereby deterring the user from using the switch 151 on socket 150. Instead, the user is motivated to use the integrated switch on the LED bulb.

FIGS. 7A-7D illustrate another embodiment of a replacement actuator 701 for a rotary switch 151 of a lamp socket 150. FIG. 7A illustrates a perspective view of a replacement actuator 701, FIG. 7B illustrates a cross sectional view of the replacement actuator 701 in a first position, FIG. 7C illustrates a cross sectional view of the replacement actuator 701 in a second position, and FIG. 7D illustrates a partially cross sectional view of a portion of the replacement actuator 701. In this embodiment, the mechanical means for deterring the user from using the lamp switch 151 during regular operation comprises an actuator 701 that replaces the conventional rotary knob 152 of the socket switch 151. The replacement actuator 701 needs to be first pressed in to actuate socket switch 151 to disconnect the AC power to the socket 150.

Replacement actuator 701 comprises a longitudinal portion 702 that mates with an actuator knob 703. The longitudinal portion 702 extends from a first end 704 to a second end 705. The first end 704 comprises a threaded bore 716 partially extending therethrough, which threads onto the threaded end 605 of the socket switch 151. The second end 705 of the longitudinal portion 702 comprises a flange 717 and a partially extending bore 706 extending therethrough. Bore 706 receives the actuator knob 703. The bore 706 comprises a circumferential channel 711 having a width extending from flange 717 to an inner lip 719. Bore 706 further comprises a first portion of an indexing gear with indexing teeth 721. The actuator knob 703 comprises a knob portion 714, a shaft portion 715, and a circumferential projection 712 extending from the outer surface of the shaft portion 715. Actuator knob 703 further comprises a second portion of an indexing gear with indexing teeth 722. A bore 718 partially extends through actuator knob 703.

The shaft portion 715 of the actuator knob 703 is received within the bore 706 of the second end 705 of the longitudinal portion 702. The circumferential projection 712 of the actuator knob 703 is received within the circumferential channel 711 between flange 717 and lip 719 inside the bore 706. The actuator knob 703 can longitudinally travel with respect to the circumferential channel 711 from a first position where the circumferential projection 712 abuts the flange 717 (FIG. 7B), to a second position where the circumferential projection 712 abuts the lip 719 inside the bore 706 (FIG. 7C). A biasing spring 713 is placed inside bore 718 of the actuator knob 703 and bore 706 of the longitudinal portion 702 for biasing actuator knob 703 to stay at the first position (FIG. 7B).

When the actuator knob 703 is in an unpressed or first position (FIG. 7B), the indexing teeth 721 and 722 of the indexing gear are not engaged, allowing the actuator knob 703 to freely rotate with respect to the longitudinal portion 702. As such, the socket switch 151 is not engaged when the user rotates the actuator knob 703. In order to actuate the socket switch 151, the user needs to first press the actuator knob 703, causing the circumferential projection 712 to travel within circumferential channel 711 until the circumferential projection 712 abuts the lip 719 inside the bore 706 at the second position (FIG. 7C). At that pressed or second position, the indexing teeth 722 of the actuator knob 703 engage the indexing teeth 721 in the longitudinal portion 702. When the user rotates the actuator knob 703 while it is pressed, the indexing gear causes the longitudinal portion 702 to also rotate, which in turn actuates the socket switch 151. Accordingly, the replacement actuator 701 provides a mechanical means that prevents an intuitive actuation of the socket switch 151, thereby deterring the user from using the switch 151 on socket 150. Instead, the user is motivated to use the integrated switch on the LED bulb.

In another embodiment a replacement actuator can be provided that first needs to be pulled out in order to actuate the socket switch 151.

According to another aspect of the present embodiments, a wireless lamp switch, such as wireless lamp switch 801 shown in FIG. 8A, may be provided to accompany the LED bulb 100 for wirelessly controlling the LED bulb 100. The wireless lamp switch is configured for being installed on the same lamp as the LED bulb 100. The wireless lamp switch may be configured to be installed on the lamp socket, lamp base, or lamp wire. The wireless lamp switch may be configured to replace the lamp's existing switch entirely, or only a portion of the lamp's existing switch, such as a conventional rotary knob 152 (FIG. 1A). According to one embodiment, the LED bulb 100 may comprise the integrated switch 120 and can be wirelessly controlled by either the actuation of the integrated switch 120, actuation of the wireless lamp switch, or via a remote electronic device, such as a smartphone 118. In another embodiment, the LED bulb 100 does not comprise an integrated switch 120 and can be wirelessly controlled by one or more of actuation of the wireless lamp switch and via a remote electronic device 118.

FIGS. 8A-8D illustrate one embodiment of the wireless lamp switch 801. FIG. 8A illustrates a perspective view of an LED bulb 100 with an accompanying wireless lamp switch 801, FIG. 8B illustrates a cross sectional view of the wireless lamp switch 801 in a first position, FIG. 8C illustrates a cross sectional view of the wireless lamp switch 801 in a second position, and FIG. 8D illustrates a partially cross sectional view of a portion of the wireless lamp switch 801.

Referring to FIG. 8A, a wireless lamp switch 801 is illustrated in the form of a replacement actuator that replaces the conventional rotary knob 152 (FIG. 1A) of the switch 151 provided on a conventional socket 150. The LED bulb 100 and the wireless lamp switch 801 can be provided as a set and installed on socket 150 of a single lamp. The wireless lamp switch 801 comprises a longitudinal portion 802 that mates with an actuator knob 803. The wireless lamp switch 801 can provide two functions. In its normal state, or a first position (FIG. 8B), the actuator knob 803 is in an unpressed state and can be rotated by the user to control the LED bulb 100. Specifically, the wireless lamp switch 801 is wirelessly paired with the LED bulb 100 and wirelessly communicates with the LED bulb 100 to control the LED bulb 100. In the unpressed state, rotation of the actuator knob 803 does not actuate the socket switch 151 and thereby does not cut off AC power to the socket 150. In order to disconnect AC power to the socket 150 (for example, when the user wishes to replace the bulb) the user can first press the actuator knob 803 to engage the longitudinal portion 802, and turn the actuator knob 803 to actuate socket switch 151.

Referring to FIG. 8B, wireless lamp switch 801 comprises a similar construction to the replacement actuator 701 discussed above. Wireless lamp switch 801 comprises a longitudinal portion 802 that mates with an actuator knob 803. The longitudinal portion 802 extends from a first end 804 to a second end 805. The first end 804 comprises a threaded bore 816 partially extending therethrough, which threads onto the threaded end 605 of the socket switch 151.

The second end 805 of the longitudinal portion 803 comprises a flange 817 and a partially extending bore 806 that receives the actuator knob 803. The bore 806 comprises a circumferential channel 811 with a width that extends from flange 817 to an inner lip 819. Flange 817 may comprise detents 841 extending therefrom. Bore 806 further comprises a first portion of an indexing gear with indexing teeth 821 (such as teeth 721 shown in FIG. 7D). The actuator knob 803 comprises a knob portion 814, a shaft portion 815, and a circumferential projection 812 extending from the outer surface of the shaft portion 815. Actuator knob 803 is substantially similar to the actuator knob 703 shown in FIG. 7D. Actuator knob 803 may comprise detents 842 extending from the circumferential projection 812 that contact detents 841 when the actuator knot 803 is in the unpressed position (i.e., first position shown in FIG. 8B). Actuator knob 803 further comprises a second portion of an indexing gear with indexing teeth 822 (such as teeth 722 shown in FIG. 7D). A bore 818 partially extends through actuator knob 803.

The shaft portion 815 of the actuator knob 803 is received within the bore 806 of the second end 805 of the longitudinal portion 802. The circumferential projection 812 of the actuator knob 803 is received within the circumferential channel 811 between flange 817 and lip 819 inside the bore 806. The actuator knob 803 can longitudinally travel with respect to the circumferential channel 811 from a first position where the circumferential projection 812 abuts the flange 817 (FIG. 8B), to a second position where the circumferential projection 812 abuts the lip 819 inside the bore 806 (FIG. 8C). A biasing spring 813 is placed inside bore 818 of the actuator knob 803 and bore 806 of the longitudinal portion 802 for biasing actuator knob 803 to stay at an unpressed position (i.e., the first position shown in FIG. 8B).

Furthermore, longitudinal portion 802 comprises a control circuit 830 disposed therein for wirelessly communicating with the LED driver circuit 110 of the LED bulb 100. Longitudinal portion 802 further comprises a recess 832 sized to receive a battery 833. Battery 833 is in electrical communication with control circuit 830 for powering the control circuit 830. The flange 817 further comprises a sensor 835 that detects the rotational position of the circumferential projection 812 of the actuator knob 803 with respect to the sensor 835. Sensor 835 is in an electrical communication with the control circuit 830 and provides an input to the control circuit 830 indicating the position of the actuator knob 803. The control circuit 830 transmits the output of the sensor 835 to the LED driver circuit 110, which controls the LED bulb 100.

In another embodiment, instead of using the battery 833, the longitudinal portion 802 may comprise a generator configured for harvesting enough energy from the mechanical motion of rotating the actuator knob 803 with respect to the longitudinal portion 802 to send a short RF signal to the LED driver circuit 110 of the LED bulb 100. The LED bulb 100 would respond by toggling on or off.

When the actuator knob 803 is in an unpressed or first position (FIG. 8B), which is its normal state, the indexing teeth 821 and 822 of the indexing gear are not engaged. As such, the actuator knob 803 can rotate with respect to the longitudinal portion 802 such that the socket switch 151 is not engaged when the user rotates the actuator knob 803. The circumferential projection 812 of the actuator knob 803 abuts the flange 817 and thereby engages the sensor 835. As such, rotation of the actuator knob 803 while it is in the unpressed or first position activates the sensor 835 to detect the rotational position of the circumferential projection 812. Detents 841 of the flange 817 contact detents 842 of the circumferential projection 812 and provide for some resistance in turning the actuator knob 803. Other means known in the art can also be provided to provide such resistance to the user when turning the actuator knob 803.

According to one embodiment, the wireless lamp switch 801 comprises an on and off setting detected by sensor 835 directing the LED driver circuit 110 to turn the LED bulb 100 on or off. In another embodiment, the wireless lamp switch 801 comprises a high-medium-low setting detected by sensor 835 configured for directing the LED driver circuit 110 to control the LED bulb 100 according to a high-medium-low light intensity.

In a further embodiment, the wireless lamp switch 801 comprises a dimmer. Sensor 835 can indicate the rotational position of the circumferential projection 812 with respect to the potentiometer 835. The rotational position information is received by the control circuit 830 from the sensor 835 and transmitted to the LED driver circuit 110 as a control signal. The control signal is used to indicate the desired intensity of the light output. In one embodiment, sensor 835 can comprise a potentiometer where rotational position of the circumferential projection 812 with respect to the potentiometer 835 at the flange 817 changes the resistance of the potentiometer, as is well known in the art. The potentiometer detects the change in resistance and transmits the change in resistance to the control circuit 830. The control circuit 830 transmits the detected resistance of the potentiometer 835 as a control signal to the LED driver circuit 110. In another embodiment, sensor 835 can comprise a rotary encoder that converts the angular position or motion of the circumferential projection 812 to an analog or digital code. The output code provides information about the position of the circumferential projection 812, which is transmitted by the control circuit 830 as a control signal to the LED driver circuit 110.

The control circuit 830 comprises a wireless interface, such as wireless interface 304, for transmitting the control signal to the LED driver circuit 110. Wireless interface of control circuit 830 can be an RF or an IR transmitter or transceiver configured for transmitting control signals via a wireless RF or IR signal via at least one short range communication protocol discussed above. The wireless lamp switch 801 can be paired via its wireless interface with one or more LED bulbs 100 as is well known in the art so that only the LED bulb 100 and the wireless lamp switch 801 installed on the same lamp will communicate. The LED bulb 100 and the wireless lamp switch 801 may be paired by, for example, pressing and holding a button on the LED bulb 100 while turning the actuator knob 803. In another embodiment, the LED bulb 100 and the wireless lamp switch 801 may be paired by actuating the integrated switch 120 on the LED bulb 100 while turning the actuator knob 803.

The user can also use the wireless lamp switch 801 of the present embodiments to actuate the socket switch 151 to cut off power to the socket 151. To actuate socket switch 151, the user needs to first press the actuator knob 803, causing the circumferential projection 812 to travel within circumferential channel 811 until the circumferential projection 812 abuts the lip 819 inside the bore 806 at the second position (FIG. 8C). At that pressed or second position, the indexing teeth 822 of the actuator knob 803 engage the indexing teeth 821 in the longitudinal portion 802. When the user rotates the actuator knob 803 while it is pressed, the indexing gear causes the longitudinal portion 802 to also rotate, which in turn actuates the socket switch 151.

According to another embodiment, rotary actuator 601, shown in FIGS. 6A-6B, can be configured to comprise a wireless lamp switch similar to wireless control switch 801. The longitudinal actuator portion 602 of the rotary actuator 601 may comprise a control circuit, such as control circuit 830, configured for wirelessly communicating with the LED driver circuit 110 of the LED bulb 100. The longitudinal actuator portion 602 may comprise a sensor, such as sensor 835, which senses the rotational position of the rotating shaft 611 or rotating cap 612. Rotation of rotating shaft 611 or rotating cap 612 with respect to the longitudinal actuator portion 602 will trigger the sensor causing wireless control signals to be transmitted to the LED bulb 100 to control the LED bulb 100, such as by turning it on or off, or controlling its intensity by either a high-medium-low setting or by dimming it.

Industrial Applicability

To solve the aforementioned problems, the aspects of the embodiments are directed towards a wireless replacement LED bulb with one or more accompanying control switches, such as an integrated switch and/or a wireless lamp switch.

The disclosed embodiments provide a system, software, and a method for a wireless replacement LED bulb with one or more accompanying control switches, such as an integrated switch and/or a wireless lamp switch. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A system for wirelessly controlling a bulb comprising:
   a bulb comprising:
      a light source;
      a first wireless interface adapted to receive wireless control signals; and
      a controller electrically connected to the light source and the first wireless interface;
   a wireless lamp switch adapted to connect to a rotary lamp switch of a lamp on which the bulb is installed, wherein the wireless lamp switch comprises:
      a first portion adapted to connect to the rotary lamp switch of the lamp;
      a second portion connected to the first portion and adapted to rotate with respect to first portion and the rotary lamp switch upon rotation;

a sensor adapted to sense a rotational position of the second portion with respect to the first portion; and
a second wireless interface adapted to transmit a wireless control signal to the first wireless interface of the controller of the bulb upon the sensor sensing a change in the rotational position of the second portion with respect to the first portion;
wherein the controller is adapted to control an operation of the light source in response to receiving the wireless control signal from the wireless lamp switch.

2. The system of claim 1, wherein the wireless lamp switch further comprises a power source.

3. The system of claim 1, wherein the second portion if the wireless lamp switch is rotatably connected to the first portion, wherein the first portion is adapted to be rotated by a user to actuate the rotary lamp switch, and wherein the second portion is adapted to be rotated by the user to control the operation of the light source via the second wireless interface.

4. The system of claim 3, wherein the first portion of the wireless lamp switch comprises an actuator knob connected to a longitudinal actuator portion, which is adapted to connect to the rotary lamp switch, wherein the second portion comprises a longitudinal rotating shaft having a bore sized to rotationally receive the longitudinal actuator portion therein.

5. The system of claim 1, wherein the second portion of the wireless lamp switch comprises a first position and a second position; wherein at the first position the second portion is adapted to rotate with respect to the first portion and the rotary lamp switch; and wherein at the second position the second portion is adapted to engage the first portion to actuate the rotary lamp switch.

6. The system of claim 5, wherein the second portion of the wireless lamp switch is adapted to be rotated by a user while being at the first position to control the operation of the light source via the second wireless interface, wherein the second portion is adapted to be rotated by the user while being at the second position to actuate the rotary lamp switch.

7. The system of claim 5, wherein the second portion of the wireless lamp switch comprises an actuator knob connected to an end of the first portion, wherein the first position comprises the actuator knob in an unpressed position with respect to the first portion, wherein the second position comprises the actuator knob in a pressed position with respect to the first portion.

8. The system of claim 7, wherein the second portion of the wireless lamp switch comprises a first portion of an indexing gear with indexing teeth and wherein the actuator knob comprises a second portion of the indexing gear with indexing teeth, wherein the second portion of the indexing gear engages the first portion of the indexing gear at the second position.

9. The system of claim 5, wherein the sensor of the wireless lamp switch is adapted to sense the rotational position of the second portion with respect to the first portion when the second portion is rotated while being in the first position.

10. The system of claim 1, wherein the wireless lamp switch comprises one or more of an on and off switch, a high-medium-low switch, and a dimming switch.

11. The system of claim 1, wherein the light source of the bulb comprises at least one LED element.

12. The system of claim 1, wherein the bulb further comprises an integrated switch adapted to be actuated by a user, wherein the controller controls an operation of the light source in response to actuation of the integrated switch.

13. The system of claim 12, the light source of the bulb comprises at least one LED element, and wherein the bulb further comprises:
an LED driver circuit that includes the controller; and
a bulb base that supports the LED driver circuit;
wherein the bulb base comprises the integrated switch.

14. The system of claim 12, wherein the integrated switch of the bulb comprises a capacitive sensor switch that energizes an electrically conductive surface on the bulb and detects the user touching the electrically conductive surface.

15. The system of claim 12, wherein the integrated switch of the bulb comprises one of a rotary collar switch, a rotary switch, a push button switch, a toggle switch, a rocker switch, a pull chain switch, a slide switch, a tactile switch, a paddle switch, and a capacitive sensor switch.

16. The system of claim 12, wherein the bulb further comprises a bulb shell that covers the light source, wherein the integrated switch is operably connected to the bulb shell, and wherein the bulb shell is adapted to actuate the integrated switch by being pressed.

17. The system of claim 12, wherein the bulb further comprises a bulb base, wherein the integrated switch comprises a rotary collar surrounding the bulb base adapted to be rotated about the bulb base by the user to control the operation of the light source.

18. The system of claim 12, wherein the integrated switch of the bulb comprises one or more of an on and off switch, a high-medium-low switch, a dimming switch, and any combination thereof.

19. The system of claim 1, wherein the controller of the bulb is further adapted to control an operation of the light source in response to receiving a wireless control signal from a remote electronic device.

20. The system of claim 19, wherein the remote electronic device comprises one of a remote control, a wireless wall switch, a smartphone, a tablet, a portable computer, intermediary network device, a wireless gateway, a router, a dedicated touch screen, a central control processor, a wireless hub, and any combination thereof.

21. A system for wirelessly controlling a bulb comprising:
a bulb comprising:
a light source;
a first wireless interface adapted to receive wireless control signals;
a controller electrically connected to the light source and the first wireless interface;
a wireless lamp switch adapted to connect to a rotary lamp switch of a lamp on which the bulb is installed, wherein the wireless lamp switch comprises:
a longitudinal portion adapted to connect to the rotary lamp switch of the lamp;
an actuator knob connected to an end of the longitudinal portion and having:
an unpressed position with respect to the longitudinal portion, wherein at the unpressed position the actuator knob is adapted to rotate with respect to the longitudinal portion and the rotary lamp switch, and
a pressed position with respect to the longitudinal portion, wherein at the pressed position the actuator knob engages the longitudinal portion to actuate the rotary lamp switch;

a sensor adapted to sense a rotational position of the actuator knob with respect to the longitudinal portion when the actuator knob is rotated while being in the unpressed position;

a second wireless interface adapted to transmit a wireless control signal to the first wireless interface of the controller of the bulb upon the sensor sensing a change in the rotational position of the actuator knob with respect to the longitudinal portion;

wherein the controller is adapted to control an operation of the light source in response to receiving the wireless control signal from the wireless lamp switch.

22. A method for wirelessly controlling a bulb by a wireless lamp switch adapted to connect to a rotary lamp switch of the lamp on which the bulb is installed, wherein the bulb comprises a light source, a first wireless interface, and a controller electrically connected to the light source and the first wireless interface, the method comprising:

sensing by a sensor of the wireless lamp switch a rotational position of a second portion of the wireless lamp switch with respect to a first portion of the wireless lamp switch, wherein the first portion of the wireless lamp switch is connected to the rotary lamp switch of the lamp, wherein the second portion of the wireless lamp switch is adapted to rotate with respect to the first portion;

transmitting via a second wireless interface of the wireless lamp switch a wireless control signal to the first wireless interface of the controller of the bulb upon the sensor sensing a change in the rotational position of the second portion with respect to the first portion; and controlling by the controller of the bulb an operation of the light source in response to receiving the wireless control signal from the wireless lamp switch.

23. The method of claim 22, further comprising the step of:

pairing the wireless lamp switch with the bulb.

24. The method of claim 22, further comprising the step of:

rotating the first portion to actuate the rotary lamp switch of the bulb.

25. The method of claim 22, further comprising the steps of:

pressing the second portion with respect to the first portion; and while at the pressed position, rotating the second portion to engage the first portion to actuate the rotary lamp switch.

* * * * *